United States Patent [19]
Frohn

[11] 4,439,127
[45] Mar. 27, 1984

[54] MACHINE FOR PRODUCING BLOWN HOLLOW SYNTHETIC RESIN WORKPIECES

[76] Inventor: Walter Frohn, Geiselgasteigstrasse 100, D-8000 Munich 5, Fed. Rep. of Germany

[21] Appl. No.: 305,639

[22] PCT Filed: Jan. 22, 1981

[86] PCT No.: PCT/DE81/00017

§ 371 Date: Sep. 21, 1981

§ 102(e) Date: Sep. 21, 1981

[87] PCT Pub. No.: WO81/02134

PCT Pub. Date: Aug. 6, 1981

[30] Foreign Application Priority Data

Jan. 22, 1980 [DE] Fed. Rep. of Germany ....... 3002191
Oct. 3, 1980 [DE] Fed. Rep. of Germany ... 8026528[U]

[51] Int. Cl.³ .................... B29C 17/07; B29C 17/12
[52] U.S. Cl. .................................. 425/155; 264/536; 264/542; 264/543; 425/156; 425/161; 425/162; 425/182; 425/526; 425/527; 425/532; 425/534; 425/541
[58] Field of Search ............... 425/139, 140, 155, 156, 425/161, 162, 182, 526, 527, 531, 532, 534, 537, 541, 806 A, 806 R; 264/540, 542, 543, 536

[56] References Cited

U.S. PATENT DOCUMENTS

| | | | |
|---|---|---|---|
| 2,290,129 | 7/1942 | Moreland et al. | 425/526 X |
| 3,081,489 | 3/1963 | Jackson et al. | 425/531 |
| 3,325,862 | 6/1967 | Mehnert | 425/532 X |
| 3,429,002 | 2/1969 | Saffron | 425/531 |
| 4,124,668 | 11/1978 | Frohn | 425/527 X |

Primary Examiner—Jan H. Silbaugh
Attorney, Agent, or Firm—Allison C. Collard; Thomas M. Galgano

[57] ABSTRACT

A machine for the blow molding of synthetic resin hollow workpieces with a unit for shutting parted blow molds and with a turntable moved in steps, with a number of rests evenly spaced round the axis of the turntable for blown hollow workpieces. The rests may be moved into a handing over position in the parting plane (E) of the blow mold shutting unit and into at least one after-processing station. There is a blow stick which is supported by a blow stick carriage moved horizontally in this parting plane between the blow position at the blow mold shutting unit and this handing over position. The blow stick carriage is indexed in the blow position in a machine bed. The blow mold shutting unit has horizontal guides for the blow mold supports only at the side furthest from the blow stick carriage.

37 Claims, 18 Drawing Figures

MACHINE FOR PRODUCING BLOWN HOLLOW SYNTHETIC RESIN WORKPIECES

The present invention is with respect to a machine for producing blown hollow synthetic resin workpieces with a machine bed, with a delivery unit (and more specially such a unit for delivery by way of an extruder head), with a blow mold shutting unit for taking up the mold halves of a blow mold (having an upright parting plane) at each blow mold support, said blow mold shutting unit being able to be moved between a top parison handing over position under the delivery unit, and a lower blow position which is at a lower level than the handing over position, with at least one blow stick which may be moved for the blow operation into the blow opening of the blow mold in the blow position, and with an after-processing unit for such blown hollow workpieces.

Synthetic resin hollow workpieces, for example as synthetic resin bottles are normally produced from a piece of plastified hollow pipe, extruded by an extruder head in a downward direction, and which is gripped by the two mold halves, able to be moved in relation to each other horizontally, of a two-piece blow mold, and then in a downward direction a blow stick is moved into the cutout designed for it in the blow mold and, at the same time, into the opening turned towards it of the cut-off piece of synthetic resin pipe (parison), the blow stick forming the bottle neck and producing the inner diameter with the right size and furthermore forming the top end face of the bottle neck.

The production rate of machines of the sort in question is, it is true, to a high degree dependent on the rated speed of the machine, but however the speed at which the machine may be run under working conditions is lower than its rated speed inasmuch as the hollow workpieces as taken from the molds and coming from the blow mold shutting unit are so plastic, and for this reason so readily bent or changed in form—at least in the lower end and neck parts—that after-processing of the hollow workpieces, as for example deburring and testing to see that they are fluid-tight, is not possible at once in a fully trued-up position, the wording "trued-up position" being used presently in respect of a completely regular position, which the hollow workpieces, produced one after the other, go into and which as such makes it possible for the tools used for processing the hollow workpieces to take effect completely truly and to be moved into quite the same positions in relation to each and every workpiece. For this reason, in the case of prior art machines, the rate of producing the workpieces had to be slowed down under the rated speed of the machine for the hollow workpieces to be cooled down enough for such after-processing without any loss of the desired form and for this reason without any waste.

For this reason one purpose of the invention is that of increasing the production rate of such a machine even although the hollow workpieces, which are still partly in a plastic condition, are moved generally slowly out of the mold. A further more special purpose is decreasing losses of time, making for a shorter cycle time generally and more specially decreasing the time in which the blow mold shutting unit is not in use, and decreasing the power needed for running the machine.

In this respect the purpose is to be effected in such a way that the machine may be simply run and may be quickly retooled when needed, while on the other hand the price in the first place of the driving system and the size of the systems for control and automatic control are kept low. Furthermore completely regular production of workpieces with unchanging quality is desired.

For effecting this purpose a turntable, designed to be moved in steps, has a number of rests, spaced round its edge evenly, for the blown hollow workpieces and may be moved by a stepping driving system between a take-over position placed at the parting plane of the blow mold shutting unit, and a number of further stations, that is to say at least one after-processing station, in that the blow stick is supported by a blow stick carriage which may be moved horizontally in the parting plane of the blow mold shutting unit between the blowing position and the handing over position, and may be indexed in the blowing position of the machine bed, and in that the blow mold shutting unit has horizontal guides for the blow mold support only on the side furthest from the blow stick carriage.

With such a system it becomes possible, after opening the blow mold, for the shutting unit to be moved at once back into the parison handing-over position, even when the blow stick with the hollow workpiece still on it has still not (or not completely) been moved out of the blowing position. Because the handing-over of the blown hollow workpiece takes place on the turntable in step with the act of parison take-over by the shutting unit, but however without the need for a high acceleration (the turntable having a certain number of rests for the hollow workpieces for producing enough further cooling of the workpieces on the turntable) the best possible use of the production rate with a high productivity on the one hand and, on the other hand, the regular forming of the workpieces and for this reason no losses, is made possible, because not only are the hollow workpieces, which are at least in part still in a plastic condition, transported without the chance of any damage, but furthermore there is a troublefree cooling down of the workpieces on the turntable in a great enough number of steps before getting to the after-processing station.

Because of the sizing operation undertaken on the bottle neck and the shrinking of the workpiece on to the stem of the blow stick, on cooling down the synthetic resin bottle, so that the bottle material is forced tightly against the blow stick, the bottle is firmly fixed to its blow stick stem after opening the blow mold.

Because, as is in almost all cases necessary, the floors of the hollows of the blow mold halves are undercut or recurrent there is a danger, on horizontally opening the two-piece blow mold, of the bottle being kept within the hollow of one or other half of the mold, it then sticking to or being gripped by the mold floor.

In order to let continuous extrusion of the pipe freely take place, the blow mold, after shutting, is moved by a distance equal to the size of one extruded piece of pipe at once out of the position under the extruder head into a blow position, out of which it is then, and only then, moved back into the position right under the extruder head, when the mold has been opened and the blown hollow workpiece taken therefrom.

If the blown hollow workpiece were gripped in the hollow in the one half of the mold, this would have the effect of stopping motion of the opened blow mold to the extruder head and the blow hollow workpiece would be damaged and furthermore damage to the blowing system itself might be produced so that the purpose of the present invention with respect to increasing the productivity of the machine, and more specially speeding up the cycle time, would not be effected. For overcoming this trouble condition, as part of a specially useful development of the invention, the blow opening has a second opening opposite it in the blow mold and on a support a keeper element is placed which may be moved into the second opening.

On shutting the blow mold round the extruded piece of pipe (parison) the length of pipe under the hollows in the two halves of the blow mold, and which on shutting the blow mold is pinched, takes the form of the lower blob, which after parting the blow mold is still joined up with the hollow workpiece produced and has to be cut off later. In the design noted so far the lower blob is formed at the second opening, the keeper element being moved into the second opening, when blowing is taking place, and for this reason into the lower blob. If the blow mold is opened, the blow hollow body is positioned and guided at the top by the blow stick and at the lower end by the keeper element and for this reason taken from the hollows in the two mold halves without any trouble, the hollow workpiece keeping its trued-up, regular upright blowing position.

As part of a specially useful form of the invention, the support for the keeper element is placed on the blow stick carriage, this offering the useful effect that the blown hollow workpiece, after opening the blow mold, may be changed over into the trued-up position from the blow position into the take-over position.

It is best for the keeper element to take the form of a pin, while, as part of a further useful development of the invention, it may be turned about an axis which is parallel to its direction of motion into and out of the second opening so that it may be moved turningly into the lower blob and, more specially, may be cleared therefrom with a turning motion unlikely to be the cause of any damage so that, when it is moved clear, there will be no damage to any workpiece which may still be in a plastic condition.

As part of a further, useful development of the invention, the motion of the blow mold shutting unit, of the blow stick carriage and of the turntable is controlled by way of a combined cam driving system positively using a common driving unit.

This makes certain that, even with the high working speeds of certain parts of the machine, all running motions take place regularly in step at all times and that, more specially, some motion may be overlapped in time for making the cycle time shorter, this being possible because it is no longer necessary for the motion of one part to have come to an end before further motion may be started without any danger of a smash-up.

As part of a still further, very useful further development of the invention the blow mold shutting unit is supported in an upright direction by way of a hydropneumatic weight balancing system.

By using this weight balancing system and furthermore by driving the machine parts by way of the combined cam driving unit, whose cam forms are so mathematically worked out that acceleration and slowing down forces, even with very short times for motion to take place, make possible running motion without sudden starts and stops and without vibration, and which simply because of the rolling friction between the cams and their roller followers, and more specially however on operation in an oil bath, responsible for a very low degree of wear, there is an important decrease in the power needed by the machine in comparison with prior art machines and furthermore there is a decrease in the price of the driving systems and control and automatic control units.

Further useful developments of the invention will be seen from the dependent claims when looked at in connection with the account now to be given.

In the account of one working example of the invention to be seen in the figures the nature of the invention will be made clear in connection with producing extrusion blown synthetic resin bottles.

FIG. 7 is a partly cut-away view looking down onto the system for a workpiece rest to be seen in FIG. 6.

Figure 1:
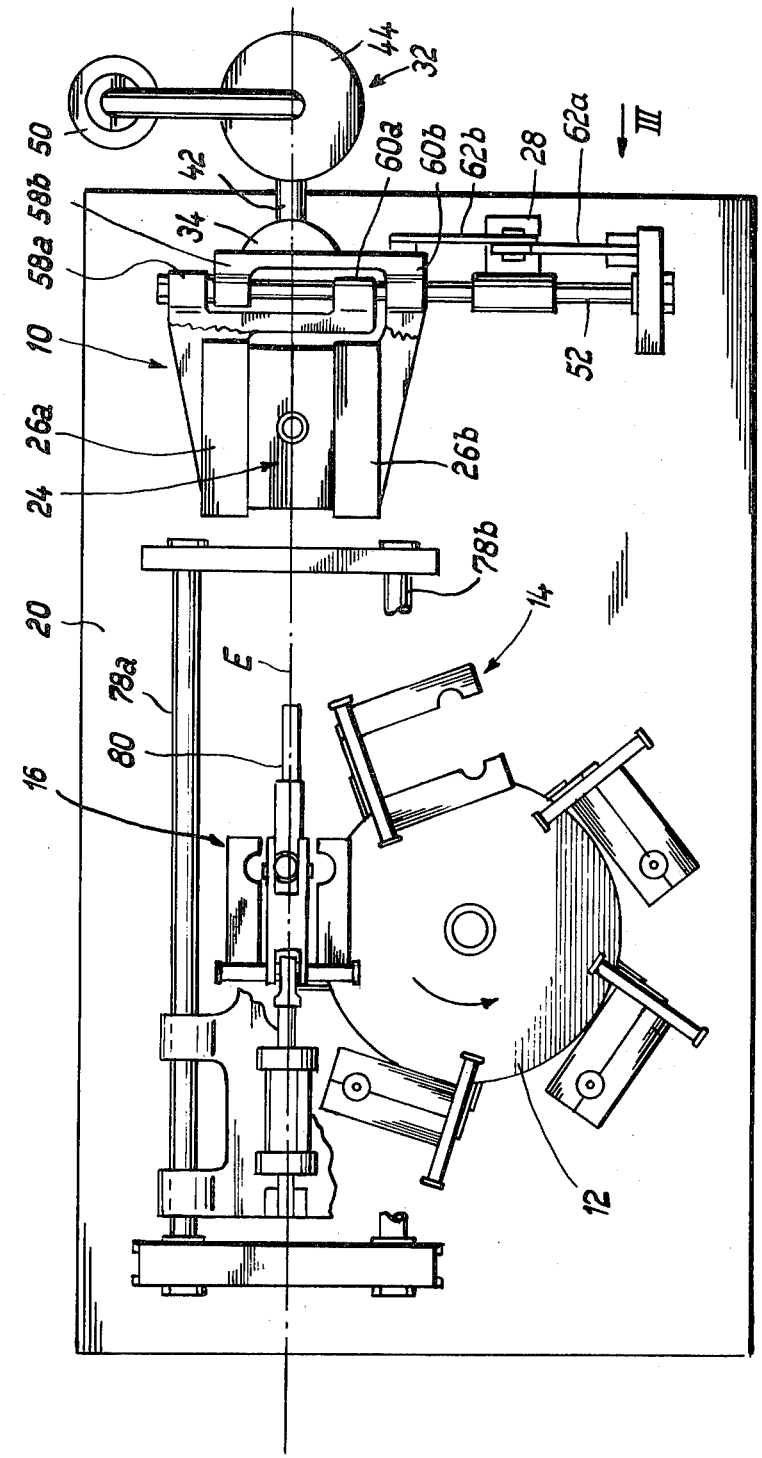
FIG. 1 is a diagrammatic plan view of the machine seen generally.

The blow molding machine to be seen in the figures and placed on a machine bed 20, is generally speaking made up of three units which are linked together; that is to say a blow mold shutting unit 10 able to be moved upwards and downwards, a turntable 12 able to be turned in steps about an upright axis and having a number of two-part mold masks 14, evenly spaced about its axis, for taking up the blown hollow workpieces, for cooling them and for after-processing (for example for deburring, and for testing them to see that they are airtight, and so on), and a blow stick carriage 16 which is able to be moved backwards and forwards between the blow mold shutting unit 10 and the turntable 12. The blow stick carriage 16 is at the same time used for transport of the blown, bottle-like hollow workpieces from the blow mold shutting unit 10 to the turntable 12. For producing the parisons to be handed over to the blow mold shutting unit use is made of an extruder, of which only the extruder head 22 is figured, the blow mold shutting unit 10 being placed under extruder head 22.

The blow-mold shutting unit 10, supporting a two-part blow mold 24 has two mold supports 26a and 26b, able to be moved horizontally in relation to each other, each such mold support taking up one half of the blow mold 24. The blow mold supports 26a and 26b are movingly supported on a guide 28 which may be moved upwards and downwards by way of an upright guide 30, such motion being produced by a cam system as will be seen later. For freeing the cam system of the full weight of the parts moved thereby and for cutting down the power needed for operation of the system generally, guide 28 is supported on a hydropneumatic weight balancing system 32.

This weight balancing system 32 is made up of a piston 36 in a cylinder 34 and which is joined up with guide 28 by way of a piston rod 38. Piston 36 is supported on oil 40 under pressure, the lower end of the mass of oil at the lower end of cylinder 34 being joined up by a connection pipe 42 with a pressure accumulator 44 in whose top part there is an air cushion 48 which is separated from the mass 40 of oil by, for example, a piston 46. The air cushion may partly be within a pressure gas bottle 50 if desired. The separating system between the gas cushion 48 and the mass 40 of oil under pressure is very much larger in cross-section than the cross-section of piston 36 so that on upright motion of the blow mold shutting unit 10 taking place the pressure of the gas cushion 48 is not markedly changed and for this reason the weight of the blow mold shutting unit 10 may be generally completely balanced when upright motion takes place.

In guide 28 two horizontal guide beams 52 and 54, placed one over the other, are movingly supported, such beams furthermore being joined up with the mold support, 26a while the mold support 26b is movingly supported on them, to which end each mold support 26a and 26b has, on its side furthest from the blow stick carriage 16, a top guide eye 56a and in the other case 56b and two spaced lower guide eyes 58a and 60a and furthermore 58b and 60b, in which respect, for strongly supporting the two mold supports 26a and 26b the lower guide eyes 60a and 60b are overlapped to such a degree that the distance between them is equal to the distance moved on parting the mold 24.

Because of this design of the guiding system the useful effect is produced, on which more details will be given later, that the blow mold shutting unit may be lifted towards the extruder head 22 after opening the blow mold 24, when the blow stick carriage 16 has not been moved clear of the blow mold shutting unit 10.

For working the blow mold shutting unit 10 use is made of two links 62a and 62b having a sort of toggle-lever function with respect to the blow mold supports 26a and 26b and powered by a hydraulic cylinder 64, the cylinder 64 being controlled by cams on the shaft of the cam driving system of which details will be given later.

A blow stick 66 is placed in the parting plane (E in FIG. 1) of the blow mold 24, the stick 66 being supported in an upright guide 68 in the blow stick carriage 16. By way of a fluid power cylinder 70, placed on the blow stick carriage 16, and which again is controlled by a cam in the cam driving system, an angled lever 72 or bell crank is worked, whose arm 73 furthest from cylinder 70 has a slot 74 in which there is a follower pin 76, this pin being fixed to blow stick 66, so that, dependent on the motion produced by the cam, the blow stick is moved upwards and downwards. The control valve for the blowing air is as well controlled by way of such a cam.

The blow stick carriage 16 is movingly supported on two guide beams 78a and 78b which are parallel to the mold parting plane E and are more specially horizontal, motion of of the carriage 16 being produced and controlled by a cam system in a way to be detailed later. In the blowing position an index pin 80, present on the blow stick carriage 16, is slipped into an indexing hole 81 on the bed 20 of the machine for fixing the position of the blow stick 66 completely regularly in relation to the blow mold 24.

In its other end position, furthest from the blowing position, the blow stick carriage 16 is so positioned in relation to the turntable 12 that the blow stick 66 is in the parting plane of a mold mask 14 which is kept in the take-over position of the turntable 12.

An account will now be given of the workings of the machine up till the handing-over of a hollow workpiece to the turntable 12.

Figure 2:
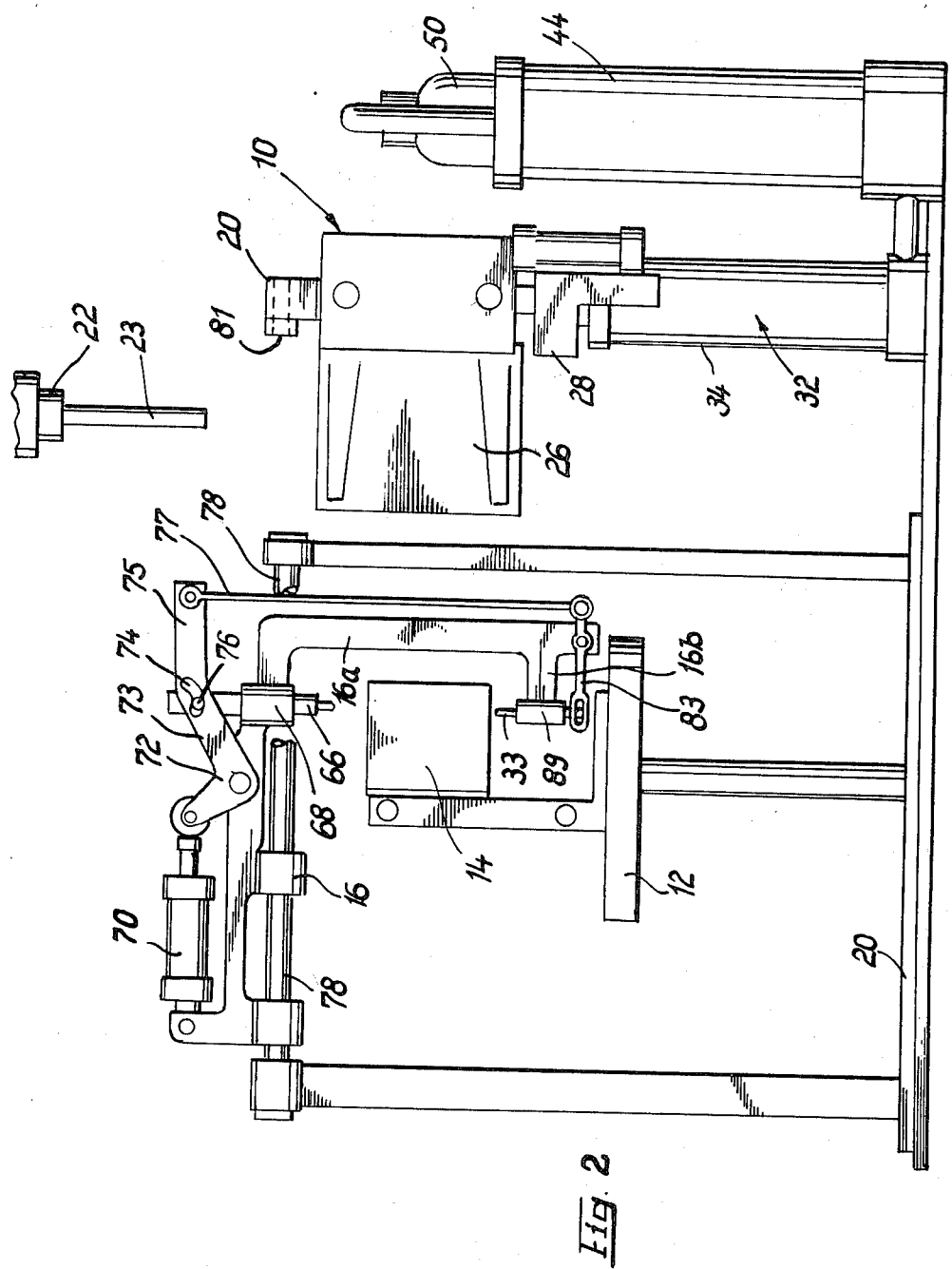
FIG. 2 is a diagrammatic side view of the machine looking in the direction of arrow II in FIG. 1.
Figure 3:
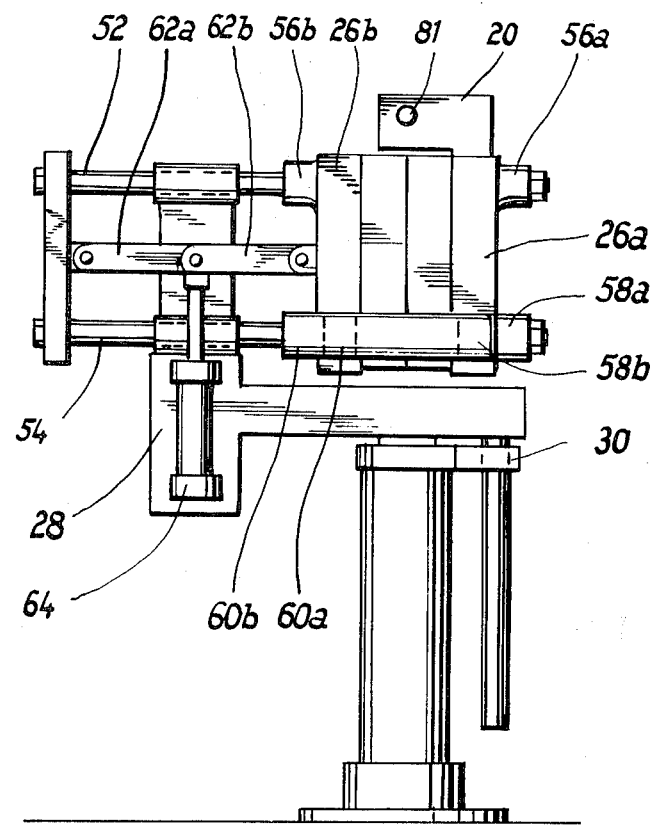
FIG. 3 is a diagrammatic view, looking in the direction of arrow III in FIG. 1, of the shut blow mold shutting unit, placed in the blow position, with the shutting system.
Figure 4:
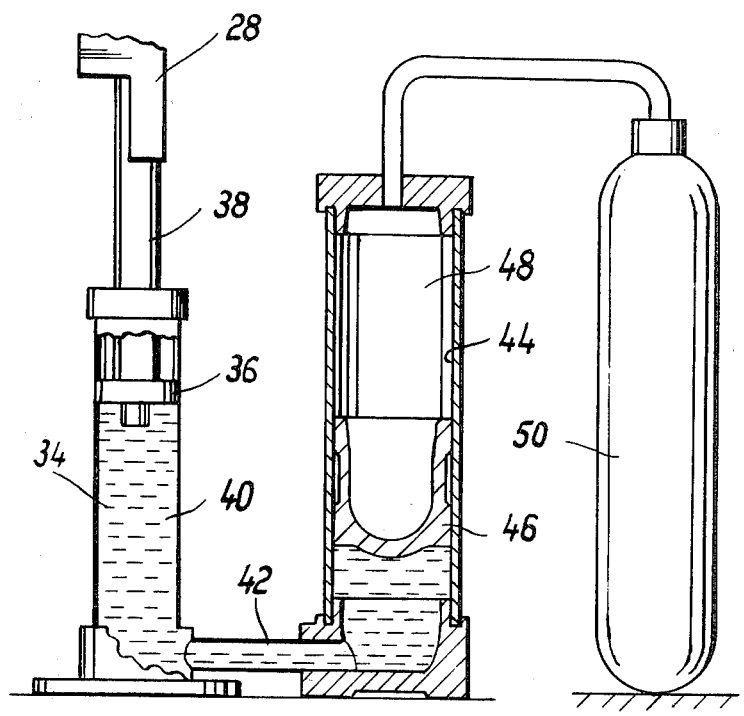
FIG. 4 is a diagrammatic, partly cut-away side view of the weight balancing system for the blow mold shutting unit, looking in the direction of the arrow II in FIG. 1, in which respect, for making the nature of the system clearer, the gas bottle is to be seen moved out of its true position.
Figure 14:
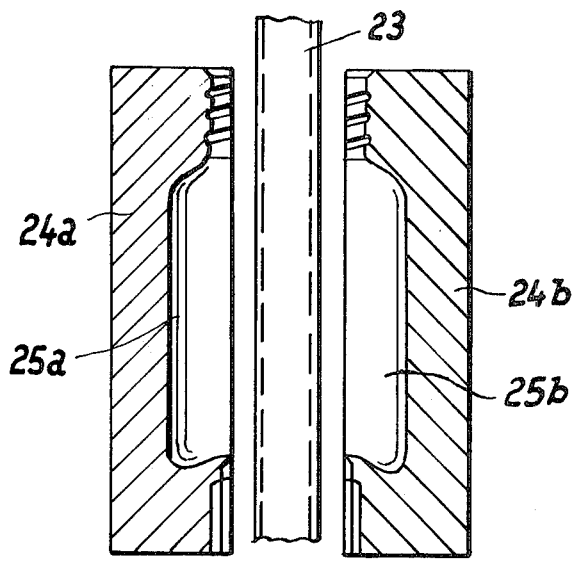
FIG. 14 is a diagrammatic section view through an opened blow mold with the extruded piece of pipe to be taken up.

In FIG. 14, in the direction of the plane of FIG. 2, a view is given of the opened blow mold, between whose two blow mold halves 24a and 24b an extruded piece of pipe 23 coming from the extruder head 22 will be seen.

The two mold halves 24a and 24b have mold hollows 25a and 25b, into which, after shutting the blow mold 24, the pipe 23 is blown.

Figure 15:
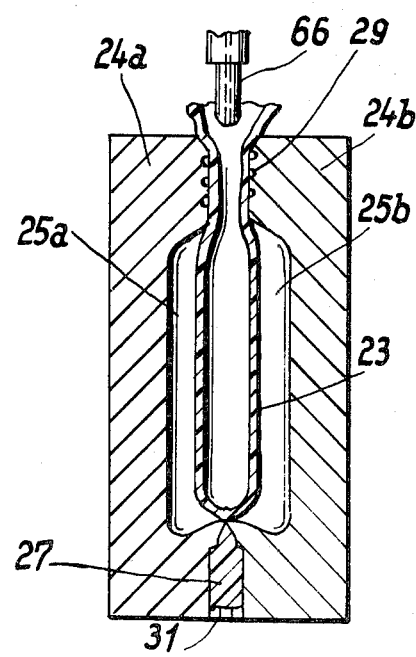
FIG. 15 is a view on the same lines as FIG. 14 with the blow mold shut before moving in the blow stick.

In FIG. 15 the blow mold 24 will be seen in its shut position, pipe 23 having been forced into the mold hollows not only in the part of the hollows 25a and 25b responsible for forming the bottle neck, but furthermore under the part, forming the floor of the bottle, of the mold hollows: In the lower part, that is to say under the lower end or floor of the bottle to be produced the pipe is pinched together forming the lower "blob" 27.

As will furthermore be seen from FIG. 15, after shutting the blow mold 24 and cutting off the length of pipe taken up by the mold from the pipe running smoothly out of the extruder head 22, and after moving the blow mold 24 clear of the extruder head 22, that is to say after lowering the blow mold shutting unit 10, the blow stick 66 on the blow stick carriage 16 is moved to a position over the top opening 29 of the mold hollows 25a and 25b, and the blow stick 66 is in fact moved into the top opening for producing the desired true size of the bottle opening and for undertaking the blowing operation.

This first opening 29 is opposite to a second opening 31 for taking up the lower blob 27 noted earlier.

Figure 16:
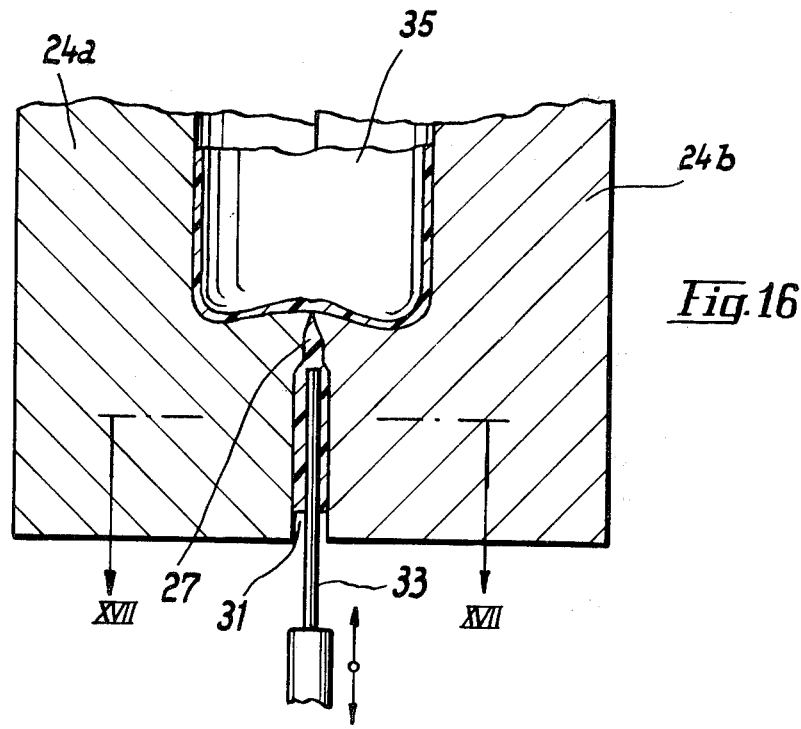
FIG. 16 is a view on a greater scale of the lower end of the shut blow mold and with the keeper element in its operation position.
Figure 17:
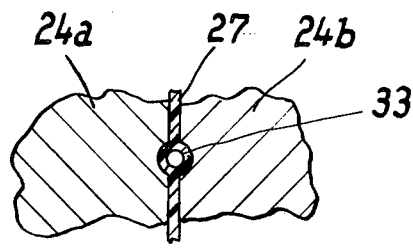
FIG. 17 is a view of a detail of the machine on the line XVII—XVII in FIG. 16.

As will be more clearly seen from FIGS. 16 and 17, at the lower opening 31 a stick-like keeper element 33 is moved into the material of the lower blob.

While the synthetic resin bottle is being taken from the mold and cooled the blow mold shutting unit 10 is in its lowermost position, that is to say in the blow position, the blow mold 24 being shut and the blow stick 66 still being kept in the neck of the bottle being produced.

After a certain, desired time has run to an end for cooling down the bottle inside the blow mold 24, the hollow workpiece, while still in the blowing position, has the air let off from it quickly through blow stick 66 on operation of a valve, which is worked by a cam of the cam system. Nextly the blow mold shutting unit 10 is opened at once, the blown, bottle-like hollow workpiece still hanging by way of its neck from the stem of the blow stick 66 while the keeper element 33 is kept within the lower blob 27. After opening the blow mold 24 the blown hollow workpiece 35 is kept in its position opposite to the blow stick carriage 16 by the blow stick 66 and the keeper element 33, which in a way to be detailed later, is supported as well on the blow stick carriage 16. If the last-named is moved in the mold parting plane from the opened mold 24 horizontally into the position to be seen in FIG. 2 it is possible for the blown hollow workpiece in a fully trued-up position to be handed over to a rest position on the turntable 12, that is to say into a mold mask 14 at this position.

Because of the locking of the blown hollow workpiece 25 the blow stick 66 on the one hand and because it is furthermore locked on the keeper element 33 on the other hand, it is possible to make certain that, on opening the blow mold 24, the hollow workpiece 25 be separated from the blow mold 24 on all sides so that there is no chance of damage to the blown hollow workpiece 25 or to the blowing apparatus.

The horizontal motion of the blow stick carriage 16 is so limited that the blow stick 66 in its one end position is over the first opening 29 of the blow mold 24, while in its other end position it puts the blown hollow workpiece 35 in a position which is right for the workpiece to be taken up by the mold mask 14.

The lever arm 73 has a tailpiece 75 running out past slot 74, such tailpiece being turningly joined with a pull bar 77 stretching in a generally downward direction. The blow stick carriage 16 has a bearing 68 in which the blow stick 66 is placed so that it may be moved uprightly. Under this bearing system 68 the blow stick carriage 16 has a U-like hanger 16a stretching downwards, one arm 16b thereof having a guide 89 for the keeper element 33, which is lined up with the bearing 68 for blow stick 66 so that the U-like hanger between the bearing 68 and the guide 89 will be seen, on looking at it from the side, to be generally U-like. Under arm 16b there is on arm 16b a two-armed lever 83 which is turningly supported and whose one end is turningly joined up with pull bar 77, while the other end of lever 83 is joined up by way of a slot 85 with a pin 87 on keeper element 33.

Figure 18:
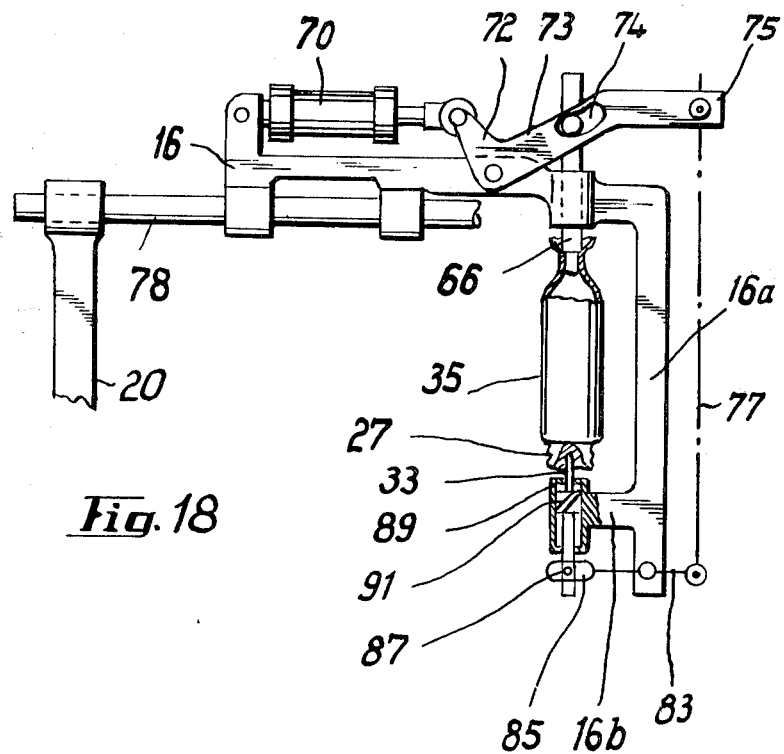
FIG. 18 is a view of part of the structure of FIG. 2 in detail and on a somewhat greater scale.

As the reader will see from FIG. 18, on motion being produced by cylinder 70, responsible for turning angled lever 72 clockwise (in FIG. 18), blow stick 66 is moved downwards, while the part which is joined up with the keeper element 33, of lever 83 is moved upwards, this forcing the keeper element 33 into the lower blob 27. Inside guide 89 there is a nosepiece, not to be seen in the figures, taken up in a spiral cutout 91 on keeper element 33 so that when keeper element 33 is moved uprightly, it is furthermore turned in guide 89. In this respect it is best for the linking connection between the lever 83 and the keeper element 33 to be so designed, in a known way, as not to have the effect of stopping or making stiffer the turning motion of keeper element 33.

In the account of the working example of the invention to be seen in the figures the keeper element 33 is for this reason moved at the same time as blow stick 66 into the synthetic resin material in/under blow mold 24 and is kept within the completed blown workpiece till, after opening blow mold 24, the block stick carriage 16 has been moved over into its other end position and the blown hollow workpiece has been taken up by one of the mold masks 14.

Keeper element 33 is best designed with a round cross-section, it becoming narrower towards the blow mold 24 so that it may be more readily forced into the lower blob 27 and pulled out of it again.

Once the blow mold shutting unit 10 has been opened, it is moved positively by the cam system into its top end position, that is to say the position for handing over the pipe, under the extruder head 22 which, all the time, is in the process of extruding the length of synthetic resin pipe. This is done for the purpose of taking up the parison which has now been produced (in the form of a length of pipe) by shutting the blow mold shutting unit. The length of pipe is then cut off as is normally the case by an impact knife or a redhot cutting edge.

After cutting the pipe, the blow mold shutting unit with the shut blow mold 24 is moved along an upright line into the blowing position, from which the blow stick 66 supporting the hollow workpiece has since been moved. After opening the blow mold 24 in the blowing position the blow stick carriage 16 will have been started on its way towards the turntable 12, such motion being able to be started without any very high acceleration because, with the onesided guiding of the blow mold supports 26a and 26b, the blow mold shutting unit 10 may be moved upwards, without being dependent on the position at the time of the blow stick carriage, once the blow mold 24 has been opened.

The horizontal motion of the blow stick carriage 16 comes to an end in the handing over position lined up with the turntable 12, in which the mold mask 14, positioned at this handing over position and at the first placed opened, is shut round the hollow workpiece, whose outer face still by this time has become cold so that it may be gripped or touched without being damaged or bent. The keeper element 33 is now pulled clear out of the lower blob 27 and at the same time the blow stick stem is moved upwards, by operation of the cylinder 27 out of the bottle neck and then is moved into the blowing position over the blow mold shutting unit 10 which has since been moved into the blowing position, this horizontal motion being able to take place much more quickly, it not being necessary to take the blown hollow workpiece into account. When the indexing pin 80 has been slipped into the indexing hole 81 by further operation of cylinder 70, the blow stick 66 is moved downwards into the opening of the piece of pipe pinched by the blow mold 24 and the blowing operation is started.

The blow mold shutting unit keeps in this position because of timing by an adjustable timing part till the bottle in the blow mold 24 has been cooled to such a degree that, after opening the blow mold 24, transport of the bottle hanging from the blow stick 66 to the turntable 12 is possible without any danger of damage or bending. In the case of throw-away bottles with a normal wall thickness made of thermoplastic materials designed for blowing in the trade, and given good mold cooling, the shortest possible cooling time may be taken to be 4 to 5 seconds.

After the blown bottle has been handed over by the blow stick 66 to a mold mask 14, the turntable 12 is moved on by a further step, for example through 60° (in the case of six mold masks 14 which are evenly spaced round the axis of the turntable 12). The turntable 12 keeps in this position till the next mold mask, which has now been moved into the take-over position, takes up a blown hollow workpiece, the turntable then being moved through a further step.

The stepping time (made up of one step and the time in which the turntable 12 is kept still between one step and the next one) is fully equal to the cycle time of the blow mold shutting unit 10. The cycle time for a throwaway bottle of hard PVC is for example made up of the dead time (about 2.5 seconds) and the cooling time, which is completely necessary in the blow mold 24 (about 4.5 seconds) to give a cycle time of about 7 seconds for such a hollow workpiece.

The number of steps of the turntable, that is to say the number of mold masks is however, for price reasons, not to be greater than is in fact completely necessary for the further cooling down of the hollow workpieces before deburring, testing to see that the workpieces are air-tight and for clearing the bottles from the apparatus. As a working guide it may be said that the turntable would have 5 or at the most 6 mold masks.

In the case of a turntable with five mold masks 14 on it, that is to say a stepping angle of 72° degrees between the masks, the resting positions, that is to say the working positions of turntable 12 will be:

Station a take-up position for taking up bottles from blow stick 66,
station b further after-cooling,
station c further after-cooling,
station d deburring and then testing for air-tightness, and
station e delivery over bottles, any waste bottles being separated from the rest.

It will be seen that the hollow workpiece undergoes further after-cooling for a time equal to twice the cycle time, the uncovered hollow workpiece having air blown onto it, if necessary, at the still plastic floor and neck parts in addition. The hollow workpiece is in this respect so quickly cooled that it may be deburred without any trouble and tested to see that it is air-tight. For this reason output may be increased by 25 to 30% over that of a prior art blow molding machine, because such a high production speed of the blow mold shutting unit may be used as is only limited by the strength of the molded, blown bottle in its body part, such operation nevertheless making possible the handing over of the bottles in a fully trued-up position to the parts of the machine in which later processing takes place.

As will be seen later from graphs of motion of parts within the machine, the transport of the bottle hanging on the blow stick 66 is so timed that the inertia effects are not responsible for any bending or loss of form at the bottle neck.

As we have seen a number of times, motion of the blow mold shutting unit 10 along an upright line, the horizontal transport motion of the blow stick carriage 16 and the steps of motion of the turntable 12 are positively controlled by a cam system, of which an account will be given.

This turning, combined cam system has a motor 82 for driving it, the motor being a DC motor whose speed may be controlled with a thyristor system, the motor turning with an unchanging torque level the main driving shaft 84 of the cam system by way of worm gearing. Stopping of the cam system generally is effected by a clutch-brake unit which may be of known design and is not detailed in the figures.

On motion of the blow mold shutting unit 10 the main driving shaft 84 is turned through less than 360° and the rest of this turning motion through 360° is kept for different control motions and functions produced by cams (of which details will be given later) keyed on the main driving shaft.

A cam 86 is keyed on the main driving shaft 84 and has positive double-acting cam race 88, within which a roller follower 90 is placed free of play, such follower being part of a lever system 92 for causing vertical motion of the blow mold shutting unit 10.

Moreover a cam 94 with circumferential races is keyed on the main driving shaft 84, it being used for driving a wheel 96 with roller followers 98 taken up in the races on cam 94. Wheel 96 is on a shaft crossing shaft 84 and it is joined with a driving lever 100 having only one arm and joined up at its free end with the blow stick carriage 16, the length of the lever being many times greater than the radius of the circle along which the roller followers 98 are moved. Because of the cam races in the cam 94 the lever 100 is moved backwards and forwards, this being responsible in turn for a backward and forward motion of the blow stick carriage 16 in a cycle.

While on the one hand the axis of the wheel 96 with the roller followers 98 is horizontal, the axis of a further wheel 102 with roller followers is upright and is in fact the axis of the turntable 12. This wheel 102 with roller followers is again moved by a cam 104 with circumferential cam races and keyed on the main driving shaft 84, cam 104 being so designed that in each cycle the turntable 12 is moved on by one further step.

The cam driving system is best placed in an oil bath.

Furthermore a number of cams 106 are keyed on the main driving shaft 84 for directly driving or electrically working further parts of the machine as part of the cycle controlled by the main driving shaft 84. These cams may furthermore be placed on a lay shaft joined up with the main driving shaft 84.

Electrical operation is used for example for turning off and braking the geared motor 82, for control of the hydraulic cylinder 70, for moving the blow stick in an upright direction, for starting the blown operation and starting high speed let-off of air.

A switching cam is used for moving a segment plate (in a way to be detailed later on) into the takeover position of the turntable for starting shutting of the mold mask 14.

The mold masks 14 are, as may clearly be seen from FIG. 7, designed as parts which may be quickly exchanged for further such parts, the two halves 14a and 14b of the masks being fixed to mask supports 112a and 112b by way of positioning pins 110.

Figure 6:
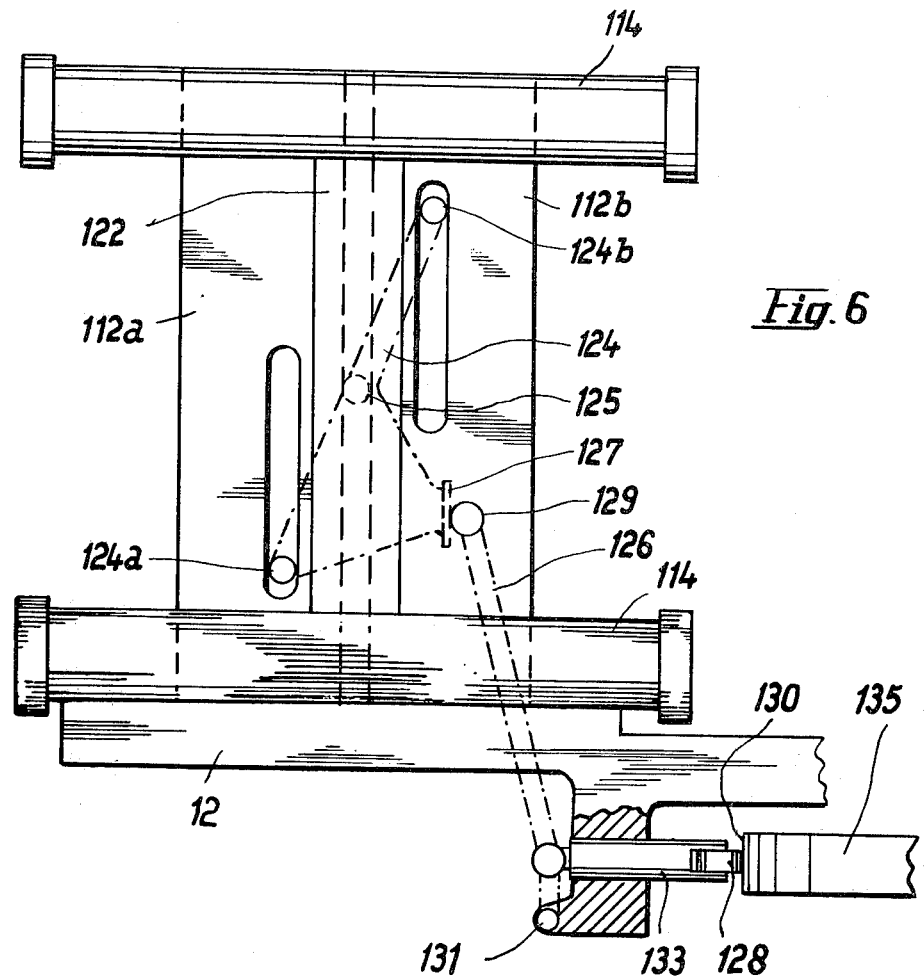
FIG. 6 is a diagrammatic side view of the system for operation of a hollow workpiece rest on the turntable.
Figure 8:
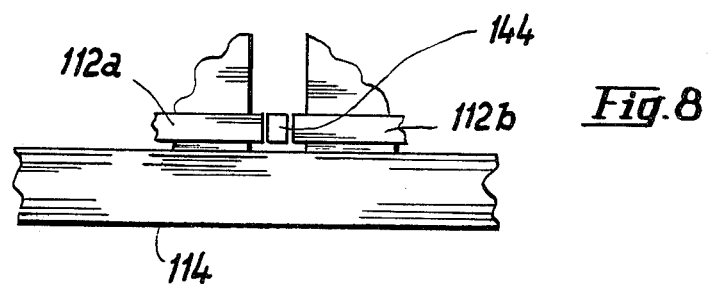
FIG. 8 is a view of a detail of what is to be seen in FIG. 7.
Figure 9:
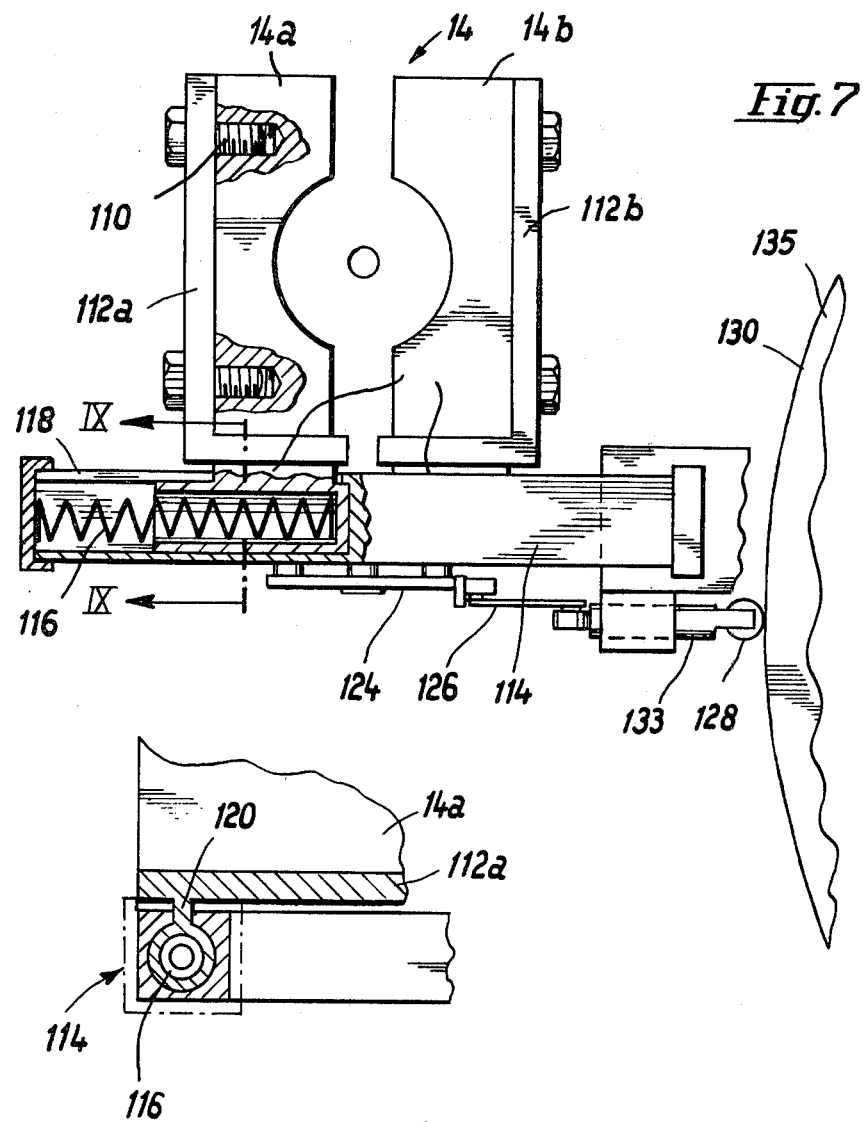
FIG. 9 is a section on the line IX—IX of FIG. 7.
Figures 10, 11:
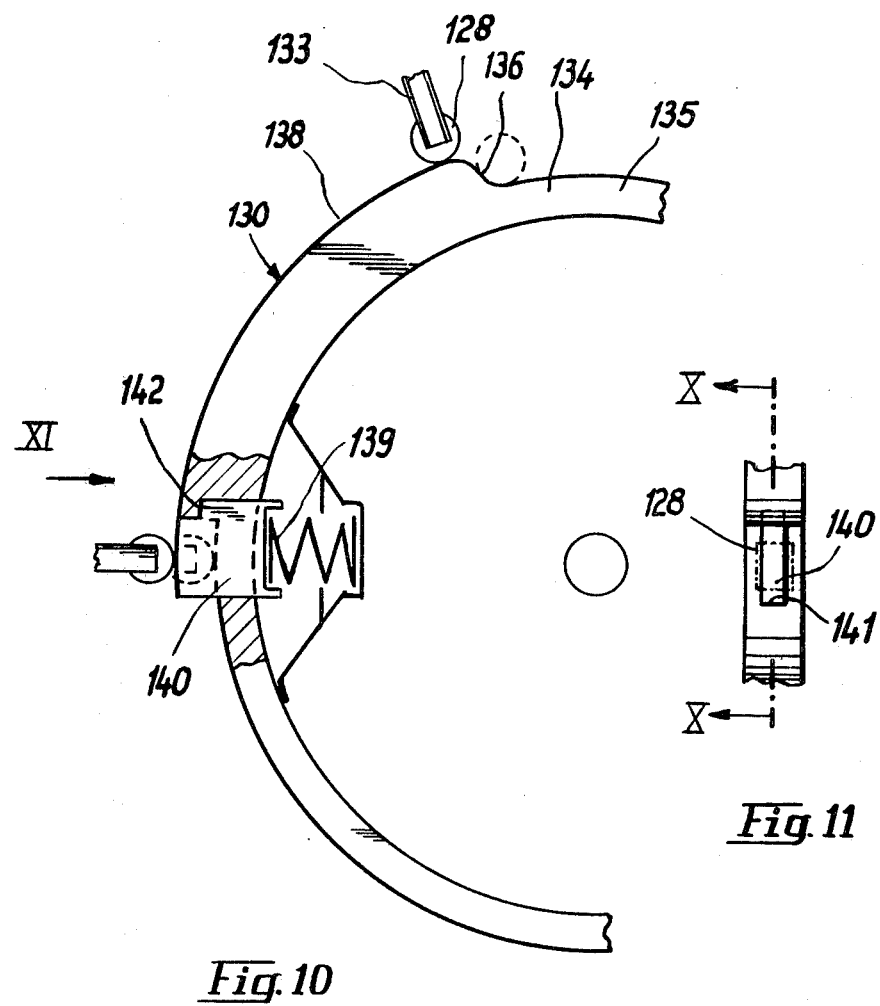
FIG. 10 is a diagrammatic view of part of the driving ring of the operation system of FIGS. 6 and 7, partly sectioned on the line X—X of FIG. 11.
FIG. 11 is a view looking in the direction of arrow XI in FIG. 10.

The mask supports 112a and 112b are, on the same lines as the mold supports 26a and 26b, only guided on one side by way of at least two horizontal guides 114 (see FIG. 6). The two mask supports 112a and 112b are kept shut by a spring effect, for which purpose for example the top guide (FIG. 6) is designed telescopingly, compression springs 116 being placed inside it, guide sleeve 118 having slots with arms 120 running through them for joining up with the mask supports 112a and 112b. Compression springs 116 are so placed between the arms 120 and the ends of the guide sleeves 118 that they have the effect of pushing the mask supports 112a and 112b nearer together.

In the mask parting plane there is, halfway up the mask supports 112a and 112b, a two-armed lever 124 on a support arm 122, the support arm supporting the guide sleeves 118 and being joined up with the turntable 12. The ends 124a and 124b which are diametrically opposite to each other in relation to the axis of turning 125 of the lever 124, are taken up in slot-like guides 132a and 132b on each mask support 112a and 112b so that on turning two-armed lever 124 clockwise (in FIG. 6) the mask supports 112a and 112b are moved out of their shut position, against the effect of the compression spring 116, into their opened position.

For causing this turning motion of the lever 124 the free end 129 of a lever 126 drivingly comes up against a header plate 127 on lever 124, lever 126 being able to be turned about a horizontal shaft 131 in a generally upright radial plane of turntable 12, and being supported on the turntable 12. On the side, nearest to the free end 129 of lever 126, of shaft 131 lever 126 comes up against a push-rod 133 which may be moved in a generally radial horizontal position in part of the turntable 12, the radially inner end of pushrod 133 having a roller follower 128 with an upright axis off turning and being forced by effect of compression springs 116 (acting by way of the lever 124, the lever 126 and the pushrod 133) against an upright cam 130 at the outer edge of a fixed generally round guide rail 135, the radius of the cam 130 becoming greater a short distance before station e, in which the bottles are taken from the mold masks, there being an uphill cam part 136 so that cam 130 has a part 134 with a smaller diameter and a part 138 with a greater diameter. The two parts 134 and 138 are placed along a circle.

On roller follower 128 running up onto cam part 138 with a greater radius the pushrod 133 is moved radially outwards in relation to the turntable 12, this turning the lever 126 which for its part is responsible for turning lever 124 in a clockwise direction (FIG. 6) so that the mask supports 112a and 112b are moved away from each other against the effect of the compression springs 116 and so that the hollow workpiece, supported by the mold mask 14, is freed therefrom.

From station e to station a, in which the blown hollow workpieces are taken from the blow stick 66, the mold mask 14 has to be kept open, and for causing opening of the mold mask 14 in station a and then moving it into a shut position without any turning of the turntable 12 for taking up the hollow workpiece and for making it possible for the blow stick 66 to be slipped out of the hollow workpiece, this part of cam part 138, on which roller follower 128 is rested in station a, is formed by a plate-like pushing shoe 140 able to be moved in a slot 141 of the guide rail 135 radially and horizontally. Pushing shoe 140 is moved radially outwards by a compression spring 139 towards a stop 142 on the guide rail 135, and in this position part 138 is lined up with the outer face of shoe 140. In this position shoe 140 is locked by a spring-worked locking part (not to be seen in the figure) which is put into operation under the control of one of the cams 106 noted keyed on the main driving shaft 84.

The unlocking of the locking part takes place once the blow stick 66 has moved one hollow workpiece into the handing-over position within the opened mold mask 14. Under the effect of the compression springs 116, whose force acting on the push-rod 133 is greater than the force of the compression spring 139 acting on the shoe 140, the last-named is moved radially inwards and the mold mask 14 in station a is shut and nextly the turntable 12 is put on the move and roller follower 128 of the mold mask 14 moving out of station a will be run along the part 134 of the guide curve or cam 135. The shoe 140 which has now been freed of the force acting on it, is pushed under the effect of compression spring 139 back against stop 142 and is fixed in this position by the lock noted.

In the case of bottles which are deburred by a stamping operation, the mold masks 14 take the form of male dies, which are made of such a form that in the deburring station it is possible for deburring stamp to be moved directly through the mold mask itself so that, for stamping off waste the only time necessary is that needed for forward and backward motion of the stamping knife or of the deburring stamp.

In the same station, after deburring and while the turntable is still not moving, testing to see that the bottle is air-tight may be undertaken, this being done by the testing stamp, placed over the unmoving bottle, and moved downwards till it is resting against the bottle neck and forced against it, the mold mask being opened to a small degree by the downward motion of the testing stamp because of the use of a wedge face 144 (FIG. 18) which may be pushed in between the arms 120.

These motions are produced mechanically by a vertically guided lever which is parallel to the testing stamp and which is joined therewith, a supporting part being able to be moved at the same time under the lower end of the bottle to be tested.

For better fixing or sticking of the bottle neck on the stem of the blow stick 66, the stem may have a bead-like ring thereon so that on transport of the bottle, which is still partly plastic, from the blow mold 24 to the mold mask 14 there is, in addition to the friction connection between the blow stick stem and the bottle neck, a locking connection. Because the mold mask 14 is placed round or shut onto the bottle before the block stick 66 is moved out of the bottle neck, there is no effect here stopping the blow stick 66 being taken out of the bottle neck.

On producing bottles with a pinched over part on the bottle neck, the blow stick 66 may furthermore have a specially formed or specially sectioned pin parallel to the axis of the blow stick, such pin acting as a further way of supporting the bottle, more specially in the case of one-sided bottles with a center of gravity to the side of the blow stick axis.

As we have seen earlier, the main driving shaft 84 is turned through 360° in one cycle of the blow mold shutting unit 10. Nextly the main driving shaft 84 is stopped by a clutch-brake unit or combination for a time (before the main driving shaft 84 is again turned through 360°) which is fixed by a timer of which adjustment is possible in a way dependent on the material, the form and the wall thickness of the hollow workpiece to be produced.

Figure 12:
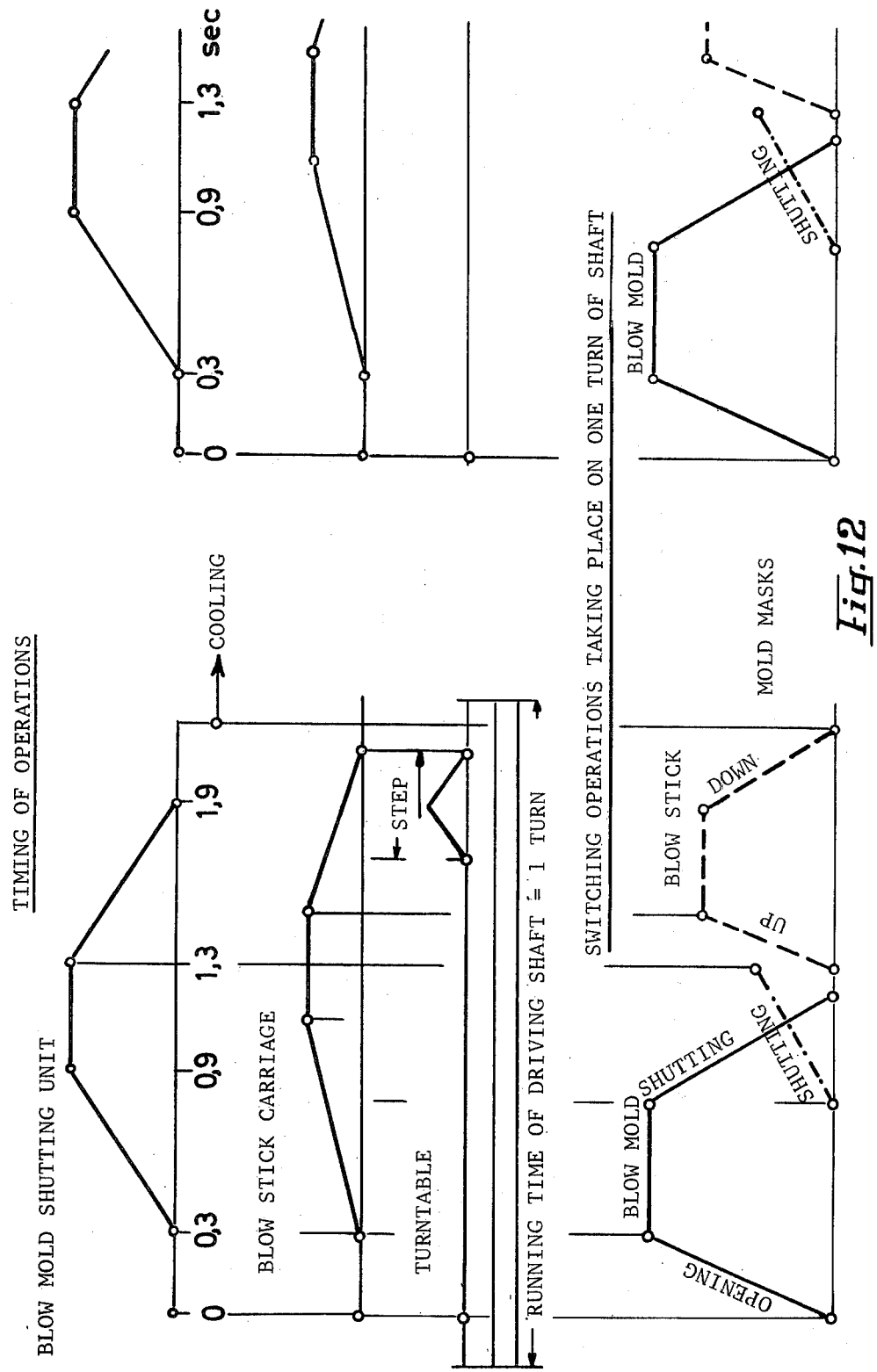
FIG. 12 is made up of graphs to make clear the motions and switching operations taking place on one turn of the main driving shaft.

A graph or diagram of the timing for one single turn of the driving shaft is to be seen in FIG. 12. The functions timed to take place on turning of the main driving shaft 84 as dependent on the cam system are the motions of the blow mold shutting unit 10, of the blow stick carriage 16 and of the turntable 12 in one cycle of the main driving shaft 84; and furthermore the timing is made clear of the opening and shutting motion of the blow mold 24 and the upright motion of the blow stick 66 in relation to turning of the main driving shaft 84. The cycle of the motions presented is started at the time O, which however is separated in time by a certain amount from the start of the turning motion of the main driving shaft 84, that is to say the opening motion, marked as the first motion, of the blow mold 24 is started only after the main driving shaft has been turned through a certain angle, this making it possible for some of the cams 106 keyed on the main driving shaft 84 to be used for switching operations as for example a high speed letting off of air from the hollow workpiece by way of the blow stick 66. In the same way it will be seen from FIG. 12 that the motion cycle comes to an end with the lowering of the blow stick 66 or its motion into the blow position, while on the other hand however the main driving shaft 84 has not at this time so far fully completed its turning motion through 360° so that even after the end of the motion cycle by way of the cams keyed on the main driving shaft 84 it is still possible for operations to be controlled, as for example deburring and testing the hollow workpiece in station d to see if it is air-tight.

Figure 5:
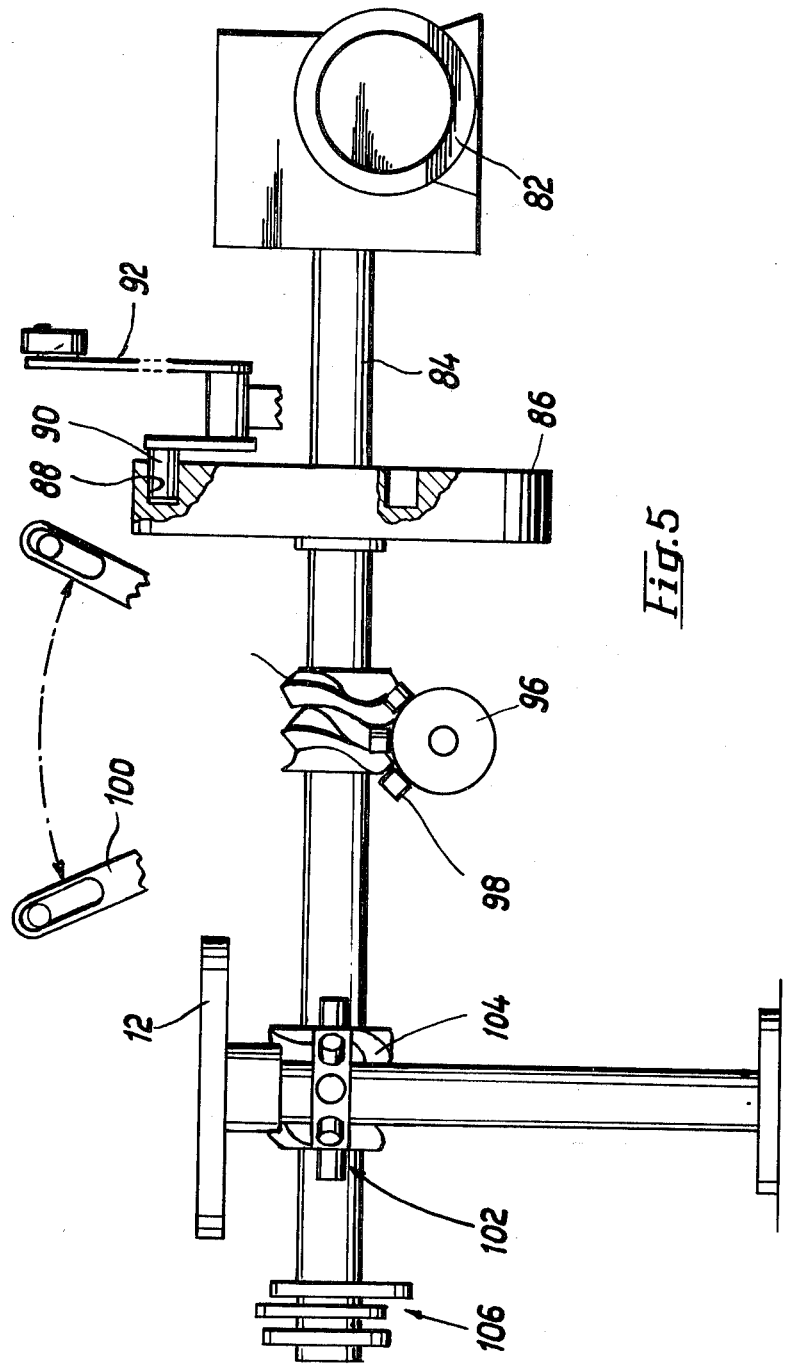
FIG. 5 is a side view, on the same lines as FIG. 2, with a diagrammatic view of the cam driving system for producing the control motion of the blow mold shutting unit, the horizontal motion in translation of the blow stick carriage and the stepped motion of the turntable with the motor, used for powering it and the cams for operation of contacts for producing further control motions.
Figure 13:
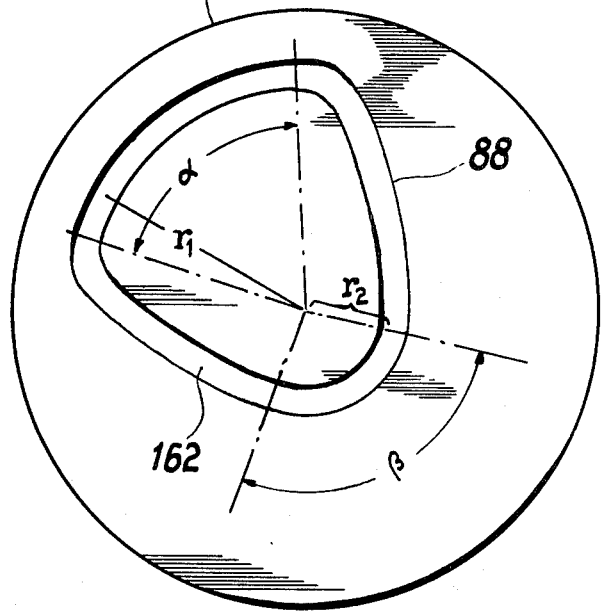
FIG. 13 is a diagrammatic view of one possible design of a cam with a positive cam follower race for causing upright motion of the blow mold shutting unit.

FIG. 13 is a view of cam 86 only by way of example, the cam having an inner double-acting or positive cam race 88 for producing upright motion of the blow mold shutting unit 10, the purpose being to make clear the design of such a cam so that, in addition to the lifting and lowering motion, the necessary stopping or dwell times are produced. This cam race 88 which, be it noted, is only given by way of example in FIG. 13, has a concentric, circle-like part stretching for angle α at a large radius about the middle point of the cam, this part, as will clearly be seen from FIG. 5, answering to the lifted position of the blow mold shutting unit. Furthermore the cam race 88 has a further part β, which is concentric as well, with a very much lesser diameter and whose position, after turning through 180° in relation to the position to be seen in FIG. 13 is marked in broken lines.

This race part β is designed answering to the lowered position of the blow mold shutting unit 10. Between the two positions there is placed a race part 162 which is designed in harmony with the desired rates of acceleration and slowing down and which is responsible for controlling the lowering of the blow mold shutting unit 10. In theory it would be possible for the race part 162 to have a further, concentric part if between the two end positions a further dwell were desired of the parts moved by the cam. The parts α and β of the race make possible running of the main driving shaft 84 in an advanced and retarded relation with respect to the upright motion of blow mold shutting unit.

The machine of which an account has been given so far may, when certain changes are made, be used as a stretch blow molding machine.

The stretch blow molding of synthetic resin bottles is, as is well known, made up of two forming stages, in which, in the first stage, the bottle undergoes first stage blowing so that it is smaller in diameter (and furthermore in length) than the completed bottle, the bottle neck however having the normal size.

After the first stage of blowing the bottle is placed in a second blowing station, which has a blow mold answering to the desired size of the bottle to be produced and in the second stage, using a second blow stick with a stretching stamp moved uprightly through the middle of the blow stick the bottle is taken from the mold for the last time, this taking place with a stretching of the bottle in the lengthways and sideways direction.

This second stage of blowing to get the bottle to its desired size has to take place in the thermoelastic range (about 70° to 90° C.).

With the machine of the present invention it is possible for this operation to take place by:

1. First stage blowing of the bottle in the blow mold shutting unit 10 which is moved upwards and downwards and using an automatically controlled mold temperature, the deburring for taking off the lower blob being possible in the blow mold 24 or when the workpiece is being moved to the mold mask 14 on turntable 12 using a knocking propeller, 2. transporting the molding produced by the first stage of blowing from the blow mold 24 to the turntable 12, the lower blob of the bottle being knocked off by a propeller if desired, and 3. handing over the molding produced in the first stage of blowing into one of the two part blow molds for completing the blowing operation, which in the case of this design are placed (in place of the two-part mold masks 14 as noted) in such a way that each two-part second stage blow mold has its own guided blow stick carriage, which is able to be moved radially outwards into the blowing position over the shut second stage blow mold. The operation of the blow stick carriage for the backward and forward motion, which is radial in relation to the turntable 12, is caused by way of an adjustable, fixed-position cam near the upright axis of the turntable 12, which is used for driving a follower and a lever system.

The turning on and off of the valve for the driving cylinder for lifting and lowering the blow stick and for starting and stopping the blowing operation and for high speed let-off of air from the workpiece is caused by cams which as well are fixed near the upright axis of the turntable.

I claim:
1. In a machine for producing blown hollow synthetic resin workpieces of the type having a machine bed, a preform delivery unit mounted on the machine bed for delivering a preform from an extruder head to a blow mold shutting unit, a blow mold shutting unit comprising two blow mold supports for taking up the blow mold halves of a blow mold split along an upright parting plane, said blow mold shutting unit being movable mounted on said machine bed for movement between an upper preform hand-over position and a lower blowing position, a blow mandrel movably mounted on said machine bed for movement between an inoperative and operative blow position, in the latter of which it is inserted into a blow opening of the blow mold, and at least one after processing unit for after-processing the blown hollow workpieces, the improvement comprising:
  a turntable having a plurality of rests for the blown hollow articles spaced about its periphery, said turntable being mounted on said machine bed for stepwise movement;
  blow mold shutting unit drive means for moving said turntable in a successive stepwise manner between a takeover position located at said parting plane of said blow mold shutting unit at which position a blown hollow article is transferred to a turntable rest by means of the blowing mandrel and at least one after-processing unit;

an oscillatable blow mandrel carriage which supports said blowing mandrel and is horizontally movable in said parting plane of said blow mold shutting unit between said takeover and said blowing positions; and, said blow mold shutting unit having a side distal to said blow mandrel carriage, on which side horizontal guides are disposed for said blow mold supports.

2. The machine of claim 1, additionally including a common drive means positively connected to said blow mold shutting unit, said blow mandrel carriage and said turntable by cam means.

3. The machine of claim 1, additionally including hydropneumatic weight balancing means for supporting said blow mold shutting unit in an upright manner.

4. The machine of claim 1, wherein said rests of said turntable comprise two-part mold masks movable between an open and a closed position and which, in said takeover position, are parted in said parting plane of said blow mold shutting unit.

5. The machine of claim 4, wherein said mold masks are spring-loaded so that they normally assume their closed positions, and wherein mold mask drive means are provided for moving said masks into their open positions, said mold mask drive means including a fixed-position cam race having a common center with said turntable.

6. The machine of claim 5, wherein said halves of said mold masks are exchangeable and wherein said mold masks are supported by mask supports having indexing parts for maintaining said mold masks in their true positions.

7. The machine of claim 6, wherein said turntable has guides and wherein said mask supports have a side on which they are supported on said guides of said turntable which, in the takeover position, is remote from said blow mold shutting unit.

8. The machine of claim 7, wherein said turntable guides comprises guide sleeves having slotted sides facing said mask supports, and wherein each mask support has an arm projecting through the slot into the associated guide sleeve.

9. The machine of claim 8, wherein at least the arms projecting into one guide sleeve, of the two mask supports are acted upon by compression springs disposed in said guide sleeves for forcing them into their closed position.

10. The machine of claim 5, wherein said cam race has a cam part for moving said mold masks into their open position, said cam part extending from a delivery station (e) for the completed hollow workpieces as far as a point right before the take-over position (a), and a moving cam part being movable between a position adding to said cam part and an ineffective position, said moving cam part being able to be locked by a lock in the position adding to said cam part and after undoing the lock is able to be moved under the effect of the springs acting on the mask supports for moving them into shut position out of its position in which it is an addition to the cam part, against the effect of a return part into its ineffective position.

11. The machine of claim 1, wherein said blow mold shutting unit has two mold supports which are disposed horizontally opposite to each other, and a guide having two parallel, vertically-spaced and horizontal guide beams movably supported therein, which beams are fixedly joined to one mold support, with the other mold support being movably supported on said beams, said blow mold shutting unit also having a drive cylinder supported on said guide, whereby motion in opposite directions of said guide beams in relation to said guide and of the mold support supported on said guide beams may be produced.

12. The machine of claim 11, wherein said driving cylinder is coupled to said guide beams and said one mold support by means of a toggle lever system.

13. The machine of claim 2, wherein said cam means has a common main driving shaft on which turning cam parts are keyed for producing timed motion of different parts of the machine.

14. The machine of claim 13, additionally including a lever system having two ends, one of which is coupled to said blow mold shutting unit, a cam having a double-acting cam race keyed on said main driving shaft, a roller follower running free of play in said race and being fixed on the other end of said lever system.

15. The machine of claim 13 wherein said blow mandrel carriage has a lever and wherein said machine additionally includes a cam wheel having a circumferential cam race keyed on said main driving shaft, a follower wheel having at least one follower running in said race free of play coupled to said carriage lever, the form of the circumferential race on said cam wheel being designed for producing a backward and forward motion of said follower wheel.

16. The machine of claim 15, additionally including a further cam wheel keyed on said main driving shaft having a circumferential cam race, a further follower wheel having a follower turning about a vertical axis running within said further cam wheel cam race without any play, said circumferential cam race of said further cam wheel being designed for moving said further follower wheel through even steps, making up 360° in all, and wherein said further wheel is drivingly joined up with said turntable.

17. The machine of claim 16, wherein said further follower wheel is joined up with said turntable.

18. The machine of claim 13 additionally including a DC mottor for driving said main driving shaft, and a thyristor control conduit for changing the speed of said motor acting through worm gearing.

19. The machine of claim 13, wherein said common drive means drives said main driving shaft intermittently, said shaft stopping after one complete 360° turn, said common drive means also including an adjustable timer for restarting rotation of the main drive shaft.

20. The machine of claim 13, wherein said cam parts of said cam means are so designed that the motion caused by them is only started after the main driving shaft has run through a certain angle, and such motion comes to an end, before said main driving shaft is moved through a certain follow-up angle.

21. The machine of claim 3, wherein said blow mold shutting unit is supported by way of a mass of oil in a vessel, the oil for its part being supported by a gas cushion, the area supporting the shutting unit of the oil being significantly smaller then the area acted upon by the gas cushion.

22. The machine of claim 21, wherein said blow mold shutting unit is supported by way of a piston placed in a cylinder on the mass of oil, said oil being coupled via a connection line with a pressure accumulator in which said oil is separated by a floating second piston having a significantly larger piston area than the gas cushion.

23. The machine of claim 21, additionally including a gas bottle for topping off said gas cushion as necessary.

24. The machine of claim 4, wherein said mold masks are designed for a stamping operation on the hollow workpieces to be deburred as female molds, through which a deburring stamp may be moved crosswise.

25. The machine of claim 5, additionally including an after-processing station having a testing stamp, which is placed on the hollow workpieces to see if they are airtight, such testing stamp being joined to a wedge for opening the two halves of the mold masks to a small degree against the effect of springs when testing is taking place.

26. The machine of claim 25, additionally including a support part movable under the lower end of the hollow workpiece to be tested in a timed manner dependent upon the motion of said testing stamp.

27. The machine of claim 1, wherein opposite the blow opening there is a second opening in the blow mold and wherein on one of said blow mandrel carriage supports there is a keeper element movable into said second openings.

28. The machine of claim 27 wherein said keeper element is in the form of a pin.

29. The machine of claim 28, wherein said pin is pivotable about an axis which is parallel to its direction of motion into and out of the second opening.

30. The machine of claim 28, wherein said pin has a round cross-section.

31. The machine of claim 28, wherein said pin is conically tapered towards the second opening.

32. The machine of claim 27, wherein said mold support of the keeper element and said mold support of the blow mandrel may be moved in common relationship to the blow mold.

33. The machine of claim 32, wherein said support of the blow mandrel and of the supports of the keeper element may be moved in common in the mold parting plane.

34. The machine of claim 27, wherein a drive means for the keeper element and a drive means for the blow mandrel are joined together for causing motion of the blow mandrel and the keeper element in opposite directions at the same time.

35. The machine of claim 1, wherein said rests of said turntable are two-part blow molds for completing the blowing operation, of which each has its own guided blow mandrel carriage.

36. The machine of claim 35, wherein the blow mandrel carriage for the second stage blow mold is placed on said turntable so that it may be moved radially and may be moved by a connection lever acted upon by a cam.

37. The machine of claim 36, wherein the lifting and lowering of the blow mandrel for the second stage blow mold, the start and the end of the blowing operation and the high speed let-off of air are controlled by cams centered on the axis of the turntable.

* * * * *